(12) United States Patent
Konno et al.

(10) Patent No.: US 7,338,191 B2
(45) Date of Patent: Mar. 4, 2008

(54) METHOD AND STRUCTURE FOR POSITIONING HEADLAMP ON VEHICLE BODY

(75) Inventors: Isao Konno, Sagamihara (JP); Hiroki Takii, Zama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 87 days.

(21) Appl. No.: 10/870,151

(22) Filed: Jun. 18, 2004

(65) Prior Publication Data

US 2004/0264203 A1 Dec. 30, 2004

(30) Foreign Application Priority Data

Jun. 24, 2003 (JP) ............................ 2003-179551

(51) Int. Cl.
*B60Q 11/00* (2006.01)
(52) U.S. Cl. .................. 362/507; 362/465; 362/487; 362/505; 362/506; 362/546
(58) Field of Classification Search ................ 362/487, 362/504, 505–507, 523, 546, 548, 465; 296/302.02, 296/203.02, 193.09
See application file for complete search history.

(56) References Cited

U.S. PATENT DOCUMENTS

| 4,636,921 | A |   | 1/1987  | Vollrath |           |
|-----------|---|---|---------|----------|-----------|
| 5,358,304 | A | * | 10/1994 | Kanemitsu et al. | 296/193.09 |
| 5,573,299 | A | * | 11/1996 | Masuda | 296/193.09 |
| 6,196,624 | B1| * | 3/2001  | Bierjon et al. | 296/193.09 |
| 6,540,284 | B2| * | 4/2003  | Miyata | 296/203.02 |
| 6,923,495 | B2| * | 8/2005  | Kishikawa et al. | 296/193.09 |
| 6,997,585 | B2| * | 2/2006  | Ito | 362/507 |

FOREIGN PATENT DOCUMENTS

| DE | 199 46 995 A1 | 4/2000 |
| EP | 1 024 075 A1  | 8/2000 |
| EP | 1 270 387 A1  | 1/2003 |
| JP | 60-075136 U   | 5/1985 |
| JP | 04-008029 Y2  | 3/1992 |
| JP | 2000-072034 A | 3/2000 |
| JP | 2001-010534 A | 1/2001 |
| JP | 2002-264745 A | 9/2002 |
| JP | 2002-326585 A | 11/2002 |
| JP | 2002-370574 A | 12/2002 |
| JP | 2003-002266 A | 1/2003 |
| JP | 2003-011848 A | 1/2003 |
| JP | 2003-095011 A | 4/2003 |

* cited by examiner

*Primary Examiner*—Stephen F. Husar
*Assistant Examiner*—Meghan K. Dunwiddie
(74) *Attorney, Agent, or Firm*—Foley & Lardner LLP

(57) ABSTRACT

A method for positioning a headlamp on a vehicle body, which includes: setting the headlamp temporarily in a first position on a first member of the vehicle body; and putting the first member and a second member of the vehicle body together, bringing the first member along with the headlamp closer to the second member, allowing the headlamp to move relative to the first member from the first position.

7 Claims, 9 Drawing Sheets

METHOD AND STRUCTURE FOR POSITIONING HEADLAMP ON VEHICLE BODY

BACKGROUND OF THE INVENTION

1. Field of Invention

The present invention relates to method and structure for positioning a headlamp on a front section of a vehicle body when assembling the vehicle body with the headlamp.

2. Description of Related Art

In a process of assembling a vehicle body, a front end module which includes a radiator core support and other parts such as a bumper fascia is put together with a front section of the vehicle body. Automotive headlamps are attached to the radiator core support in the front end module.

Japanese Patent Application Publication Laid-Open No. 2002-264745 discloses a structure, in which a bumper fascia provided with headlamp attachments, is put together with a front section of the vehicle body.

SUMMARY OF THE INVENTION

In the aforementioned structure, the headlamps are fixed to the radiator core support, and the radiator core support is positioned on front fenders which are fixed to hood ridges in the front section of the vehicle body. Accordingly, it is difficult to adjust the alignment of the radiator core support, hood ridges, headlamps and front fenders. Misalignment thereof results in uneven gaps or steps formed on a surface, affecting the appearance of the front section of the vehicle body.

The present invention was made in the light of this problem. An object of the present invention is to provide method and structure for properly positioning a headlamp on a front section of a vehicle body.

An aspect of the present invention is a method for positioning a headlamp on a vehicle body, comprising: setting the headlamp temporarily in a first position on a first member of the vehicle body; and putting the first member and a second member of the vehicle body together, bringing the first member along with the headlamp closer to the second member, allowing the headlamp to move relative to the first member from the first position.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
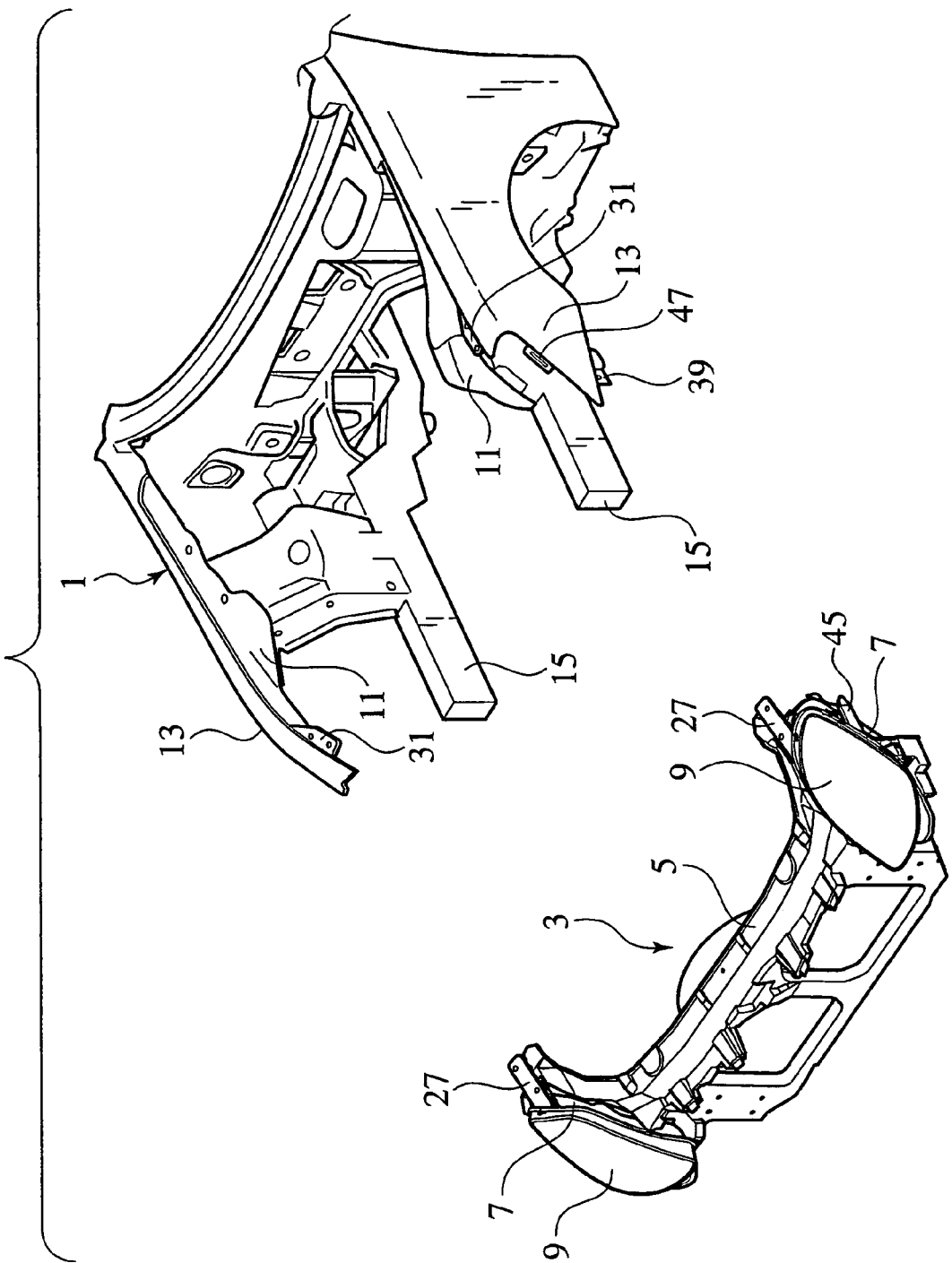
FIG. 1 is an exploded perspective view showing a structure for positioning a headlamp on a vehicle body according to an embodiment of the present invention, in which a front end module and a front section of a vehicle body are shown apart from each other.

An embodiment of the present invention will be explained below with reference to the drawings, wherein like members are designated by like reference characters.

As shown in FIG. 1, a front end module 3 is put together with a front section of a vehicle main body 1. An assisting device or a robot with a mounting jig (not shown) for gripping the front end module 3 may be used for bringing the front end module 3 closer to the vehicle main body 1.

The front end module 3 includes a radiator core support 5 which has lamp attachments 7 on upper portions of outer ends in a vehicle transverse direction thereof. Headlamps 9 are attached onto the lamp attachments 7 in a state of being held temporarily. On both transversely outer sides of the front section of the vehicle main body 1, there are front fenders 13 fixed to hood ridges 11. On lower part of the front section of the vehicle main body 1, on both transversely outer sides thereof, there are front side members 15 extending frontward.

Figure 2:
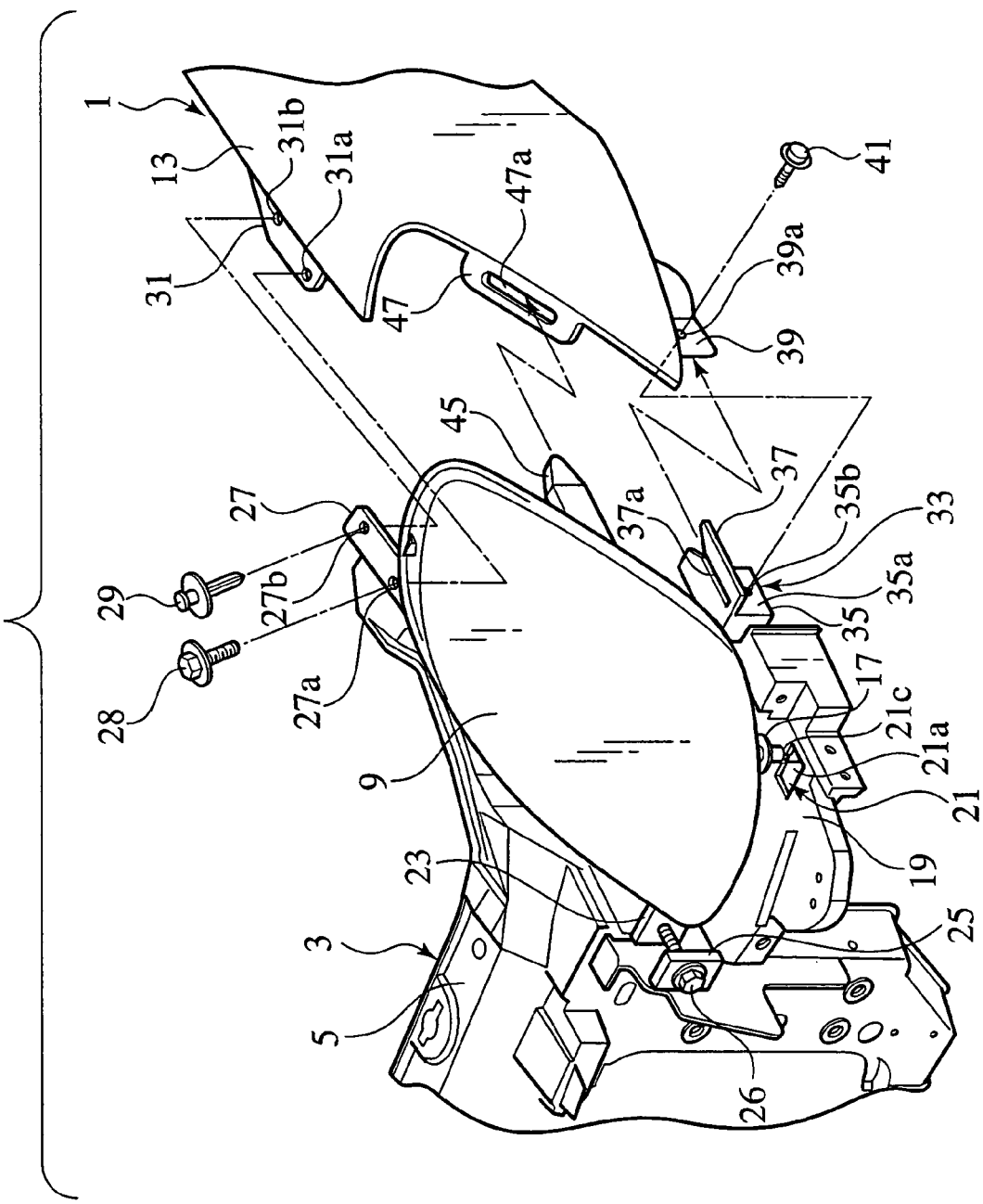
FIG. 2 is a perspective view showing a left side of the front section of the vehicle body when the front end module is brought closer to the front section of the vehicle body, in which a temporarily holding device for the headlamp is shown.

FIG. 2 is a perspective view showing a left side of the front section of the vehicle main body 1 when the front end module 3 of FIG. 1 is brought close to the front section of the vehicle main body 1. A right side of the front section is symmetrical to the left side thereof. Description will be made only on this left side, and explanation of the right side will be omitted.

A round bar-shaped pin 17 for temporally holding the headlamp 9 is formed to extend downward from a lower portion of the headlamp 9. Below the headlamp 9, a substantially horizontal planar portion 19 is formed on the radiator core support 5. On the planer portion 19, a hole 21 is provided. The pin 17 is inserted into the hole 21 and temporarily held by the hole 21. These pin 17 and hole 21 constitute a temporarily holding device for the headlamp 9.

Figure 3:
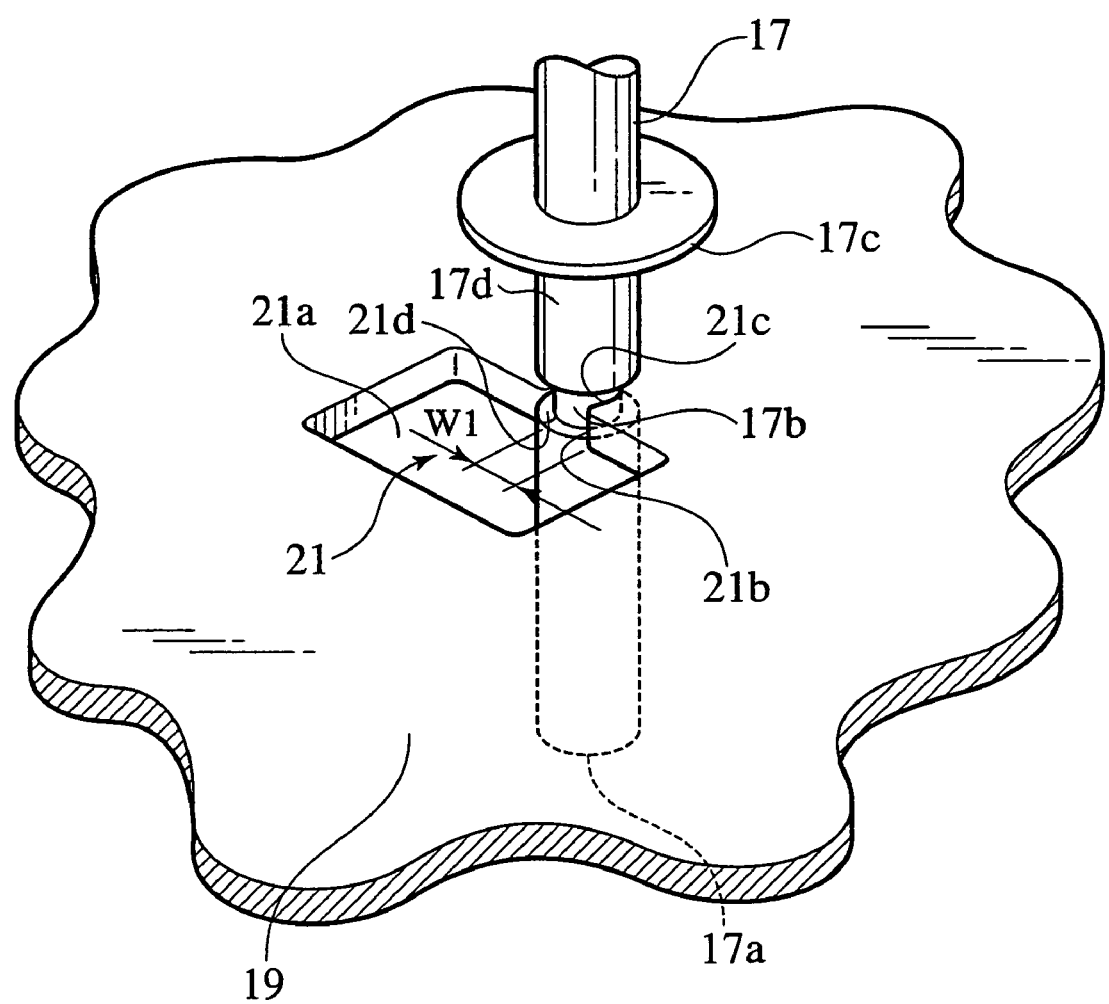
FIG. 3 is an enlarged perspective view of pin and hole of the temporarily holding device of FIG. 2.

As shown in FIG. 3, the pin 17 is formed to have a groove portion 17b having a width larger than a plate thickness of the planar portion 19 on an outer circumferential surface thereof at a position apart from a tip portion (lower end) 17a by a predetermined distance. Moreover, the pin 17 is formed to have on the outer circumferential surface above the groove portion 17b, a disc flange 17c extending from the outer circumferential surface. The hole 21 is constituted of a rectangular opening 21a and a holder portion 21c provided on a rear side of the opening 21a. The holder portion 21c communicates with the opening 21a through a communicating portion 21b, and extends rearward therefrom.

The holder portion 21c is an inner edge of the planar portion 19 formed in a semicircular shape, and an inner diameter thereof is set larger than an outer diameter of the groove portion 17b of the pin 17, and smaller than an outer diameter of a portion 17d above the groove portion 17b. Accordingly, if the groove portion 17b of the pin 17 is inserted into and engaged with the holder portion 21c, the headlamp 9 is temporarily held by the front end module 3.

The communicating portion 21b is formed to have an opening width W1 somewhat smaller than the outer diameter of the groove portion 17b. This makes it difficult for the groove portion 17b in the holder portion 21c to move into the opening 21a through the communicating portion 21b. Thus, the headlamp 9 is not released easily from the temporal holding thereof. When the groove portion 17b is inserted into the holder portion 21c, opening edges 21d of the communicating portion 21b are elastically deformed to some extent to allow the groove portion 17b to get through the communicating portion 21b.

The temporarily held headlamp 9 is thus located in the rear of a normal attachment position thereof on the front end module 3, and is movable frontward relative to the front end module 3 while being kept in this state.

Moreover, the flange 17c of the pin 17 is formed larger than the opening 21a. Thus, in case the temporal holding of the headlamp 9 is undone, the flange 17c is caught on the planar portion 19, preventing the headlamp 9 from falling beyond a limited extent.

A front bracket 23 is formed on a front part of a transversely inner side of the headlamp 9. The radiator core support 5 is provided with a front headlamp bracket 25, which is located in front of the front bracket 23 of the temporarily held headlamp 9 at a predetermined interval. A front fixing bolt 26 is inserted into the front headlamp bracket 25 from the front, and a rear end of the front fixing bolt 26 is temporarily fastened to the front bracket 23.

On a rear part of the transversely inner side of the headlamp 9, a rear bracket 27 is provided which extends rearward. On this rear bracket 27, a bolt insertion hole 27a and a clip insertion hole 27b are made, into which a rear fixing bolt 28 and a clip 29 are respectively inserted.

On an upper inner edge of the front fender 13, a rear headlamp bracket 31 formed with a bolt insertion hole 31a and a clip engagement hole 31b. On a lower side of the rear headlamp bracket 31, at a location corresponding to the bolt insertion hole 31a, a nut (not shown) is fixed for fastening the rear fixing bolt 28 thereto.

Figure 4A:
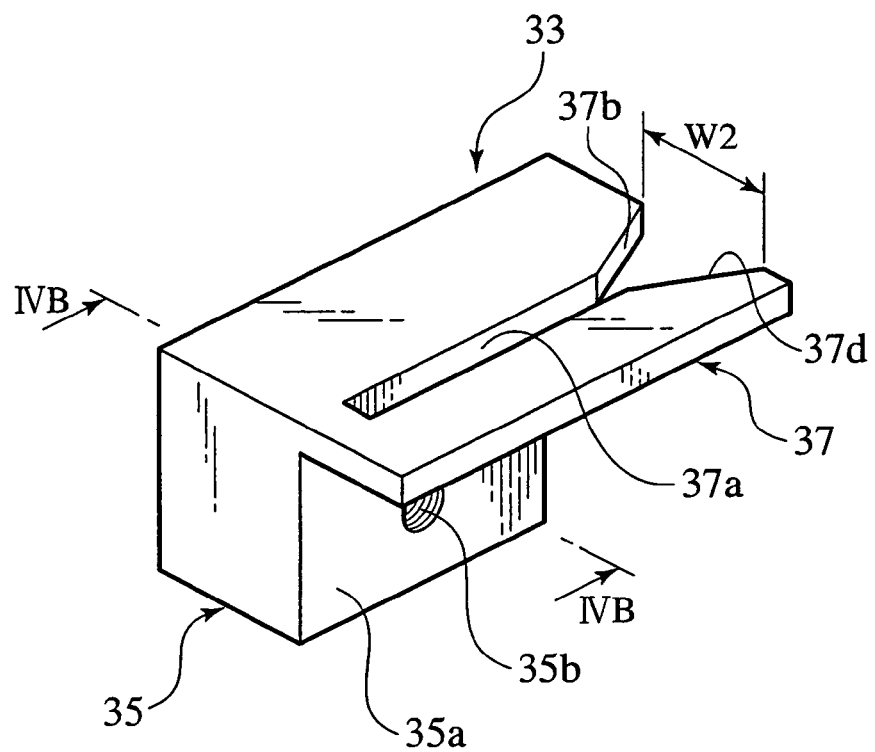
FIG. 4A is an enlarged perspective view of a fixing block of FIG. 2.

Furthermore, a fixing block 33 is provided on an outer lower portion of the headlamp 9. FIG. 4A is an enlarged perspective view showing the fixing block 33. The fixing block 33 includes a block-shaped fender bracket 35, and a plate-shaped fender guide member 37 horizontally extending from an upper part of the fender bracket 35.

On a transversely outer side face 35a of the fender bracket 35, a screw hole 35b is provided. On a front lower end of the front fender 13, a lower bracket 39 is provided, on which a bolt insertion hole 39a is provided. A bolt 41 is inserted into the bolt insertion hole 39a, and is fastened to the screw hole 35b of the fixing block 33.

The fender guide member 37 extends from the upper portion of the fender bracket 35 transversely outward and has a part extending rearward. A guide groove 37a is formed on the fender guide member 37 to extend frontward from a rear end thereof. The guide groove 37a is formed on a rear end thereof with a tapered notch 37b progressively widening rearward. An entrance 37d of the guide groove 37a opens with a width W2.

Figure 4B:
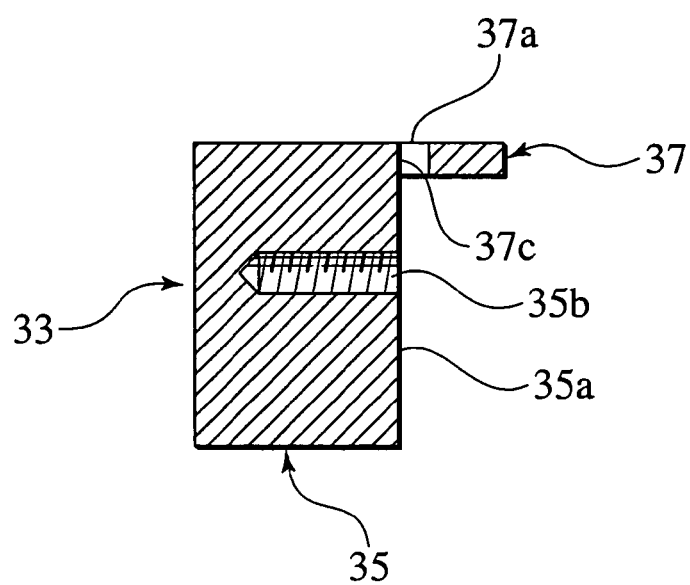
FIG. 4B is a cross-sectional view of the fixing block taken along line IVB-IVB of FIG. 4A.

The guide groove 37a receives and guides the lower bracket 39 of the front fender 13, which has a thickness t1. As shown in FIG. 4B, an inner sidewall 37c of the guide groove 37a and the side face 35a of the fender bracket 35 are set substantially flush with each other.

Specifically, the fender guide member 37 guides the front edge of the lower bracket 39 of the front fender 13 into the guide groove 37a, providing inner edges of the guide groove 37a as slidable on both transversely outer and inner sides of the vertically extending lower bracket 39.

Moreover, the headlamp 9 has a rear side face extending upward and rearward from a lower part thereof where the fixing block 33 is provided. On the rear side face, a positioning pin 45 is provided to protrude rearward. The positioning pin 45 is tapered to have at a tip thereof a width W3 in the horizontal direction.

Meanwhile, substantially in the middle of a front edge in the vertical direction of the front fender 13, at a location corresponding to the positioning pin 45, a pin receiver 47 is provided, which is formed to protrude transversely inward from the front edge and to have an inclined face to be matched to the aforementioned rear side face of the headlamp 9. The positioning pin 45 is inserted into a positioning hole 47a with a horizontal width W4, provided on the pin receiver 47. The headlamp 9 is thus positioned on the vehicle main body 1.

Next, an operation will be described. First, the headlamp 9 is temporarily held on the radiator core support 5. This temporal holding is achieved by inserting the temporarily holding pin 17 into the opening 21a of the hole 21, pushing the pin 17 rearward to have the groove portion 17b of the pin 17 fitted into the holder portion 21c, as shown in FIG. 3, and inserting the front fixing bolt 26 into the front headlamp bracket 25, and fastening the rear end of the front fixing bolt 26 temporarily to the front bracket 23 of the headlamp 9.

The front end module 3, with the headlamp 9 temporarily held on the radiator core support 5, is moved from the position shown in FIG. 2, and brought closer to the front section of the vehicle main body 1.

Figure 5:
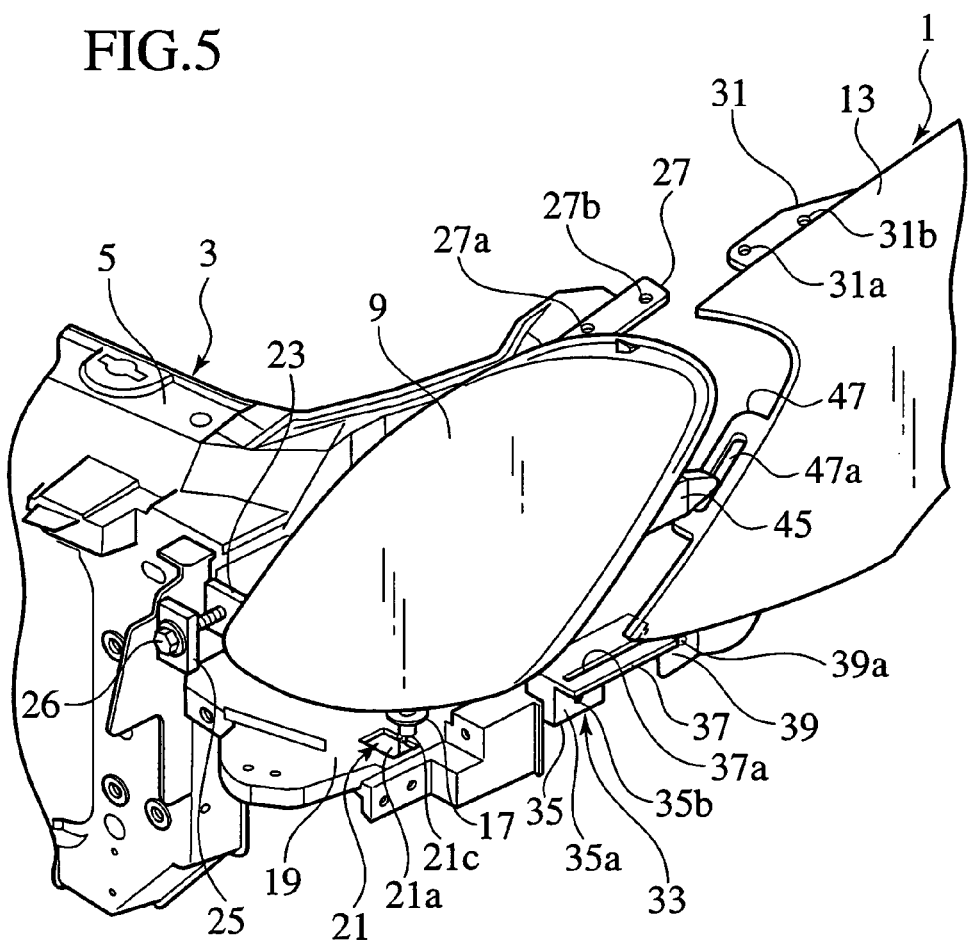
FIG. 5 is a perspective view showing a state where the front end module of FIG. 2 is brought closer to the front section of the vehicle body.
Figure 6:
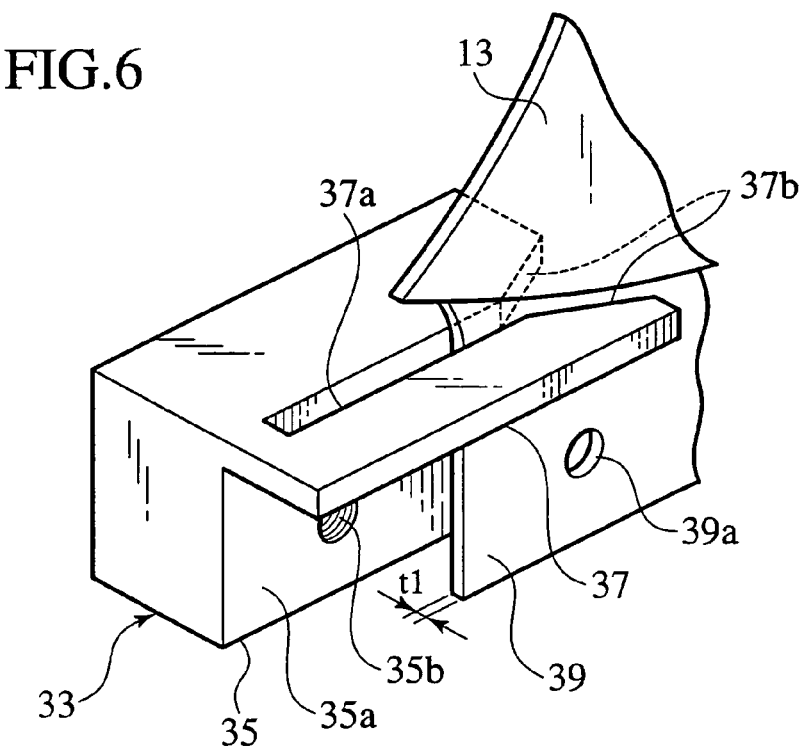
FIG. 6 is an enlarged perspective view of the fixing block in FIG. 5 and a front lower end of a front fender.

When the front end module 3 and the vehicle main body 1 are brought into a state shown in FIG. 5 by the above mentioned operation, first, the front edge of the lower bracket 39 of the front fender 13 starts entering the guide groove 37b of the fender guide member 37 as shown in FIG. 6. Specifically, the fender guide member 37 catches the front edge of the lower bracket 39 and guides the lower bracket 39 into the guide groove 37b with the inner edges thereof sliding on transversely inner and outer sides of the lower bracket 39. Here, the notch 37b is formed at the entrance of the guide groove 37a, and accordingly, the lower bracket 39 can be easily guided to enter the guide groove 37a.

Figure 7:
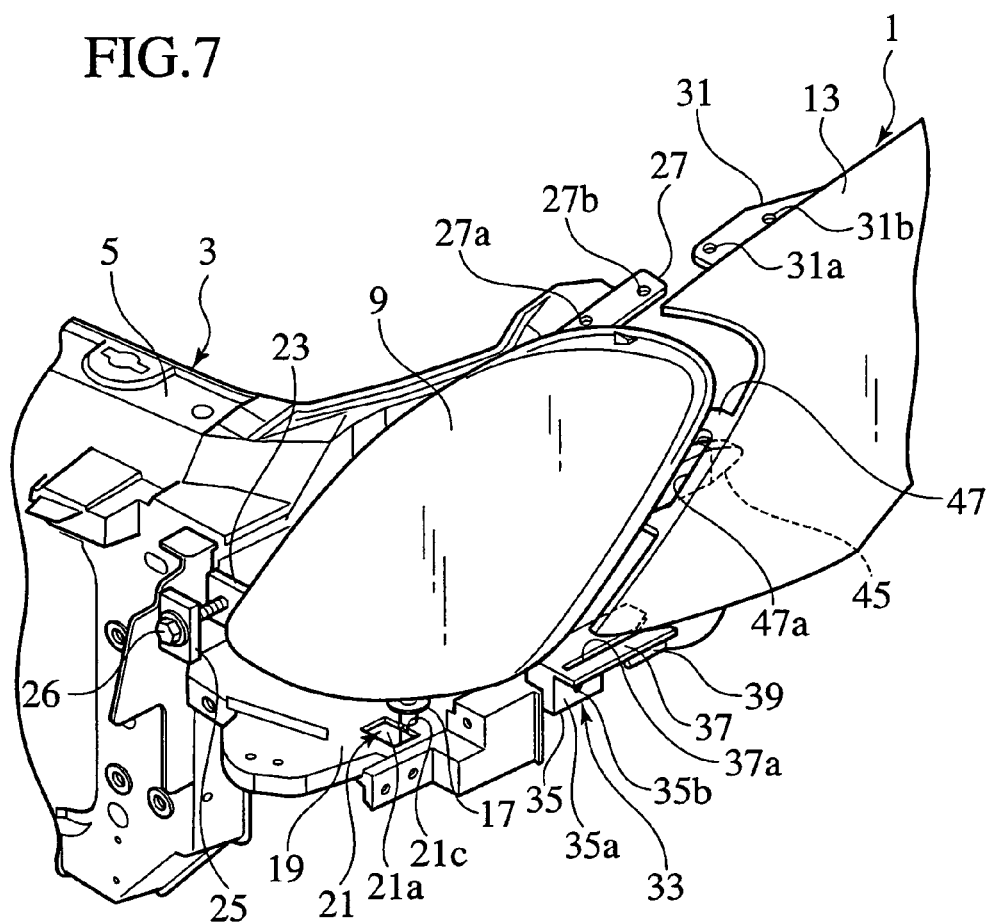
FIG. 7 is a perspective view showing a state where the front end module of FIG. 5 is brought further closer to the front section of the vehicle body.
Figure 8:
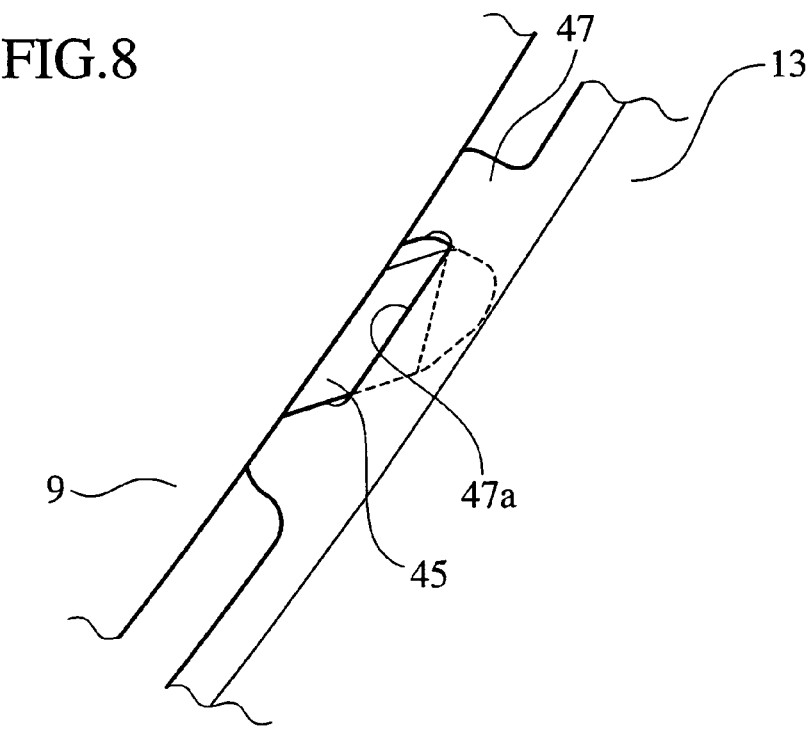
FIG. 8 is an enlarged perspective view of a positioning pin in FIG. 7.

When the front end module 3 is brought further closer to the vehicle main body 1 from the position shown in FIG. 5, the lower bracket 39 of the front fender 13 moves into a deep front part of the guide groove 37a as shown in FIG. 7, and then the positioning pin 45 starts engagement with the positioning hole 47a as shown in FIG. 8.

The lower bracket 39 of the front fender 13 is guided into the guide groove 37a before the positioning pin 45 starts engagement with the positioning hole 47a, and the positioning pin 45 is tapered at its leading end. Accordingly, the positioning pin 45 can easily engage with the positioning hole 47a.

Figure 10:
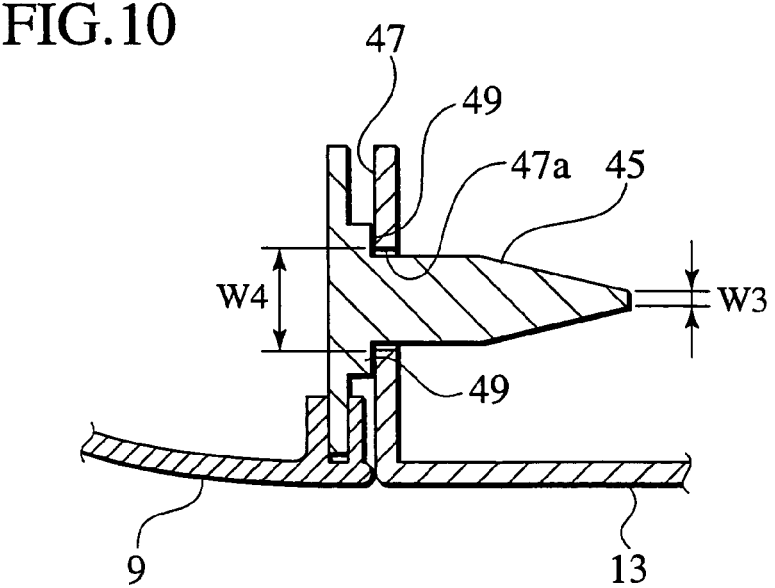
FIG. 10 is a cross-sectional view of the positioning pin taken along line X-X of FIG. 9.

When the front end module 3 is brought still closer to the vehicle main body 1 from the position shown in FIG. 7, a contact face 49 provided around a base end portion of the positioning pin 45 comes into contact with front side of the pin receiver 47 as shown in FIG. 10. The headlamp 9 is thus naturally positioned on the vehicle main body 1 in the vehicle longitudinal, transverse and vertical directions.

At this moment, the rear bracket 27 of the headlamp 9 is placed on the rear headlamp bracket 31 of the front fender 13. The bolt insertion holes 27a and 31a are aligned to be match with each other, and the clip insertion hole 27b and the clip engagement hole 31b are aligned to be match with each other.

Figure 9:
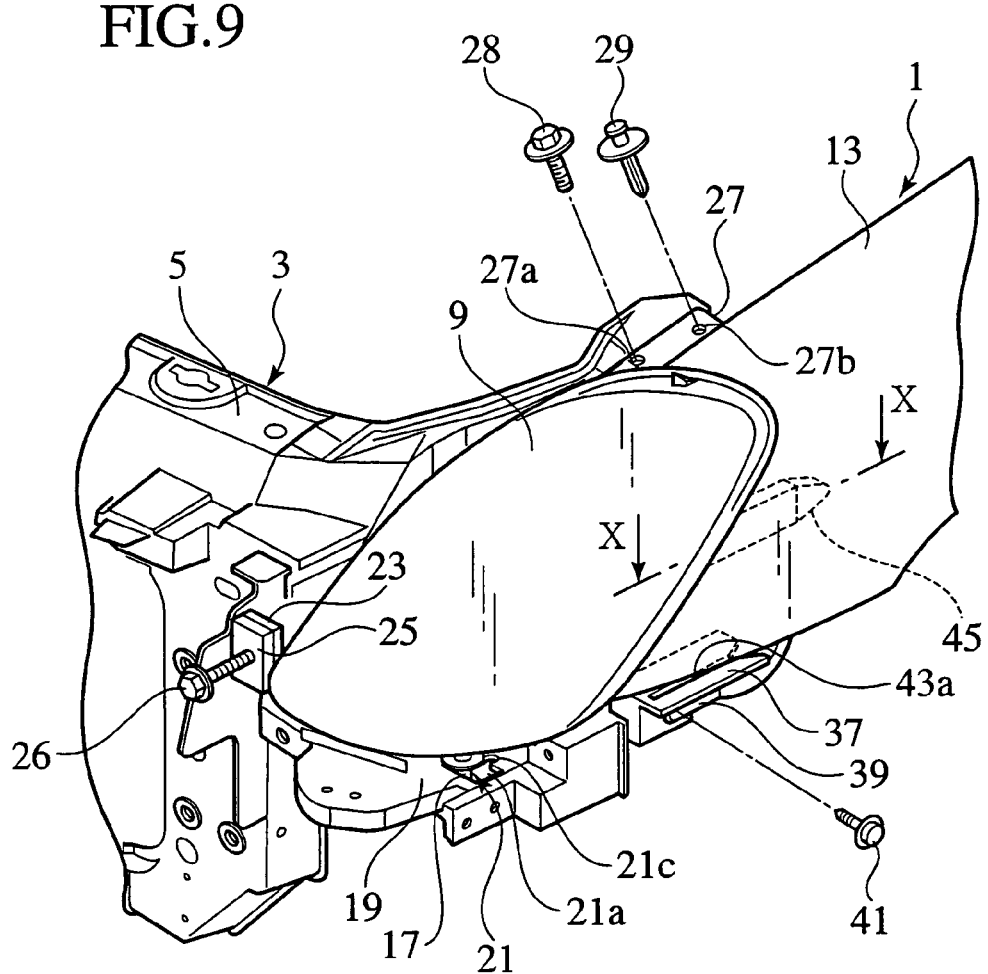
FIG. 9 is a perspective view showing a state where the front end module of FIG. 7 is brought still further closer to the front section of the vehicle body.
Figure 11:
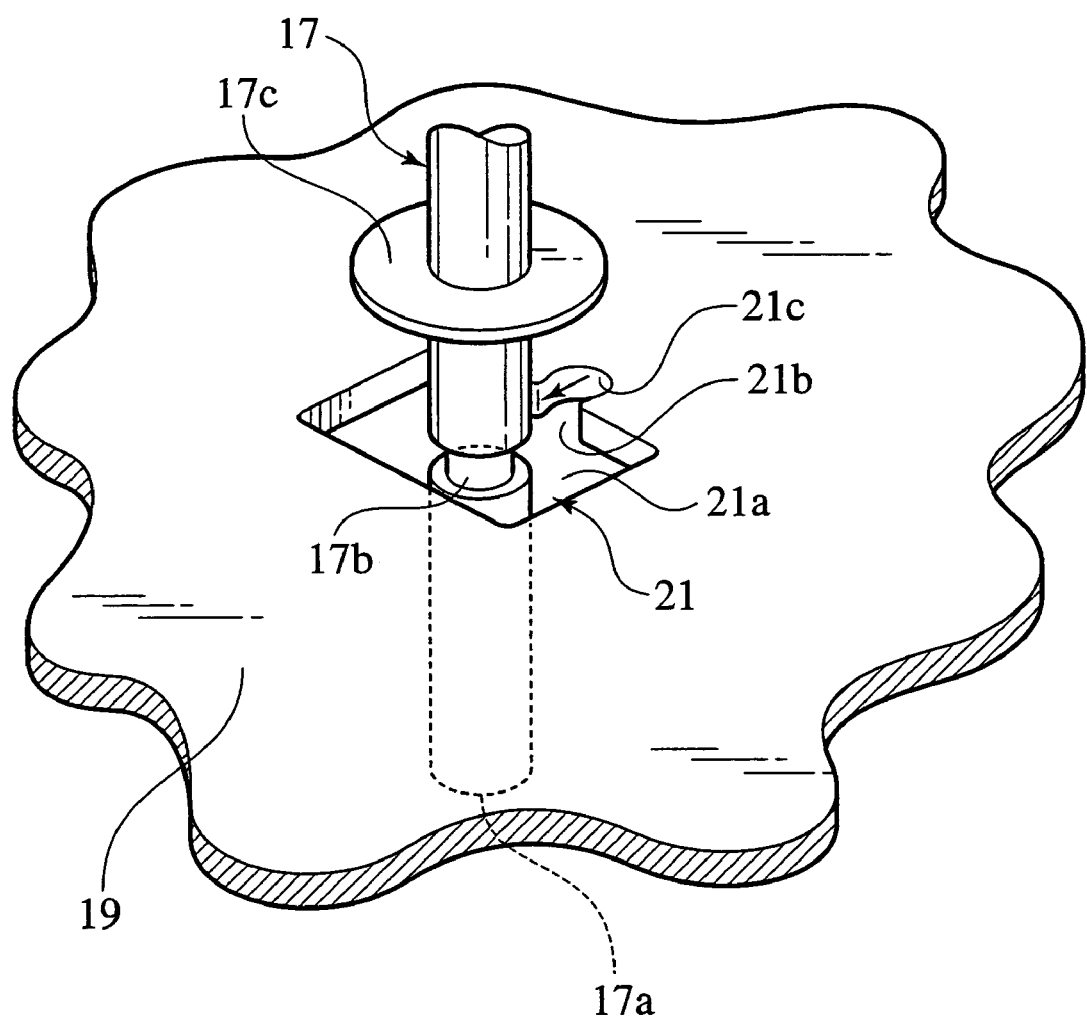
FIG. 11 is an enlarged perspective view of the temporarily holding device in FIG. 9.

When the front end module 3 is further moved towards the vehicle main body 1 from the position shown in FIG. 10, the headlamp 9 moves together with the vehicle main body 1, and accordingly the radiator core support 5 moves rearward relative to the headlamp 9. By this relative movement, as shown in FIG. 9 and FIG. 11, the temporarily holding pin 17 is detached from the holder portion 21c, and moves into the opening 21a. Thus, the temporal holding of the headlamp 9 is undone.

In this case, the flange 17c of the pin 17 is brought into contact with a peripheral edge of the opening 21a, and prevents the headlamp 9 from falling beyond the limited extent.

Figure 12A:
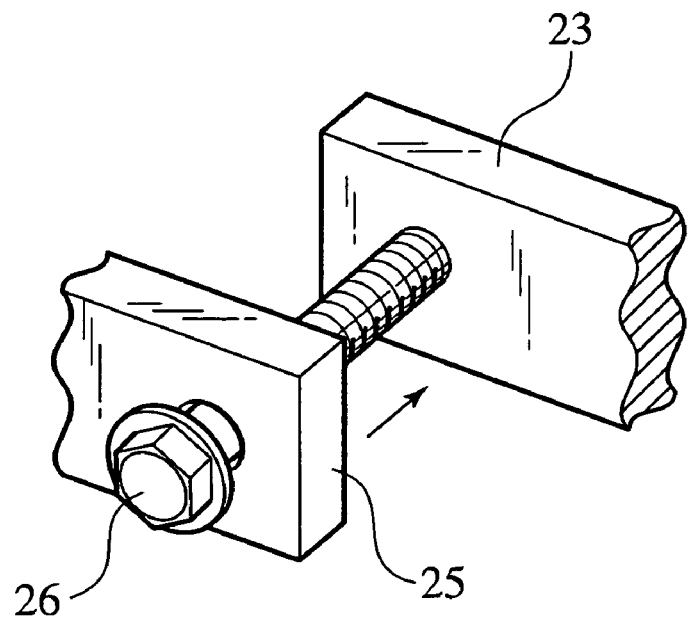
FIG. 12A is an enlarged perspective view showing a relative position of a front bracket of the headlamp and a front headlamp bracket provided on the radiator core support in FIG. 5.
Figure 12B:
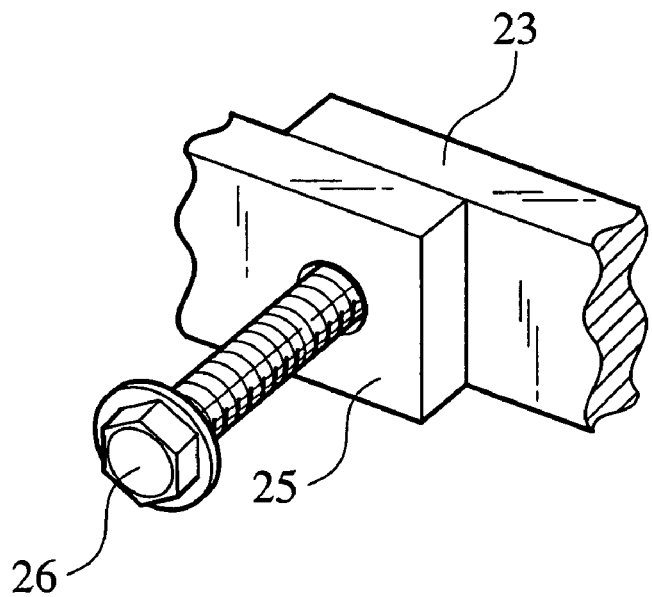
FIG. 12B is an explanatory perspective view showing a relative position of the front bracket of the headlamp and the front headlamp bracket.

With the headlamp 9 released from the temporal holding, the front headlamp bracket 25 provided on the radiator core support 5 moves further rearward relative to the headlamp 9. Motions in this case are shown in FIGS. 12A and 12B. Specifically, the front headlamp bracket 25 moves rearward from the position shown in FIG. 12A, then comes into contact with the front bracket 23 of the headlamp 9, as shown in FIG. 12B, with the front fixing bolt 26 protruding frontward from the front headlamp bracket 25.

In this state, by tightening the front fixing bolt 26, the front bracket 23 is fastened to the front headlamp bracket 25 of the radiator core support 5. As shown in FIG. 9, the clip 29 is inserted into the clip insertion hole 27b, and the rear fixing bolt 28 is inserted into the bolt insertion hole 27a and tightened. Thus, the rear bracket 27 of the headlamp 9 is fastened to the rear headlamp bracket 31 of the front fender 13.

Furthermore, the bolt 41 is inserted from transversely outer side into the bolt insertion hole 39a of the lower bracket 39 of the front fender 13, and screwed into the screw hole 35b of the fender bracket 35. The fixing block 33 of the headlamp 9 is fixed to the lower bracket 39, whereby the headlamp 9 is positioned on the front fender 13.

According to the embodiment, the headlamp 9 is temporarily held on the radiator core support 5 in a position at the rear of the normal attachment position thereof relative to the front end module 3. Then, the front end module 3 is brought closer to the front section of the vehicle main body 1 from the front of the vehicle main body 1, to be put together with the front section. The head lamp 9 comes into contact with the front section of the vehicle main body 1 and is positioned on the front section, at a time when the front end module 3 is moved rearward. Thereafter, the headlamp 9 moves frontward relative to the radiator core support 5.

Since the headlamp 9 is positioned on the front fender 13, affection of misalignments of the radiator core support 5, hood ridge 11, headlamp 9 and front fender 13 are eliminated. The headlamp 9 and the front fender 13 are aligned, and gaps and steps formed on a surface thereof can be even and smooth, improving the appearance of the front section of the vehicle body.

Moreover, at the aforementioned positioning work, even if the front end module 3 is somewhat deformed by weight of its own, the headlamp 9 can be securely positioned on the front fender 13 since the headlamp 9 is set movable relative to the front end module 3 in the state of being temporarily held.

Furthermore, the headlamp 9 is incorporated in the front end module 3 while being temporarily held on the radiator core support 5. Accordingly, work of installing the headlamp 9 is eliminated, thus reducing the number of steps in the manufacturing process.

Moreover, when the front end module 3 is put together with the vehicle main body 1, the upper portions of transversely outer ends thereof are fixed to the hood ridges 11, as shown in FIG. 1, and the lower portions thereof are fixed to the front ends of the front side members 15.

When the front end module 3 is brought close to the vehicle main body 1, the guide groove 37a of the fender guide member 37 and the lower bracket 39 of the front fender first start engagement with each other, before the positioning pin 45 and positioning hole 47a starts engagement therebetween. Therefore, allowable relative positional shift between the engaging positioning pin 45 and positioning hole 47a may be set smaller than that of the headlamp 9 and the front fender 13. For example, a difference between the tip width W3 of the positioning pin 45 and the opening width W4 of the positioning hole 47a may be set smaller than a difference between the entrance width W2 of the guide groove 37a of the fender guide member 37 and the thickness t1 of the lower bracket 39 of the front fender 13.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2003-179551, filed on Jun. 24, 2003, the disclosure of which is expressly incorporated herein by reference in its entirety.

What is claimed is:

1. A method for positioning a headlamp on a vehicle body, comprising:
    setting the headlamp temporarily in a first position on a first member of the vehicle body; and
    putting the first member and a second member of the vehicle body together, bringing the first member along with the headlamp closer to the second member, bringing the headlamp into contact with the second member so that the contact releases the headlamp from a state of being temporarily set and moving the headlamp relative to the first member from the first position for positioning.

2. The method according to claim 1, further comprising:
    providing a guiding member on the headlamp which guides a part of the second member of the vehicle body as the first member is brought closer to the second member.

3. The method according to claim 2, further comprising:
    providing a first positioning member on the headlamp, and a second positioning member on the second member of the vehicle body, which engages with the first positioning member as the first and second members of the vehicle body are put together, wherein the guiding member on the headlamp starts guiding the part of the second member before engagement of the first and second positioning members.

4. A structure for positioning a headlamp on a vehicle body, comprising:

first and second members of the vehicle body, the first member being brought closer to the second member to be put together with the second member; and a holding device provided on the first member, which temporarily holds the headlamp in a first position on the first member as the first member is brought closer to the second member, and allows the headlamp to be released therefrom by the second member coming into contact with the headlamp and to move relative to the first member from the first position for positioning as the first member is put together with the second member.

5. The structure according to claim 4, further comprising:

a guiding member provided on the headlamp for guiding a part of the second member of the vehicle body, as the first member is brought closer to the second member.

6. The structure according to claim 4, further comprising:

a first positioning member on the headlamp; and a second positioning member on the second member of the vehicle body, which engages with the first positioning member as the first member is put together with the second member, wherein a guiding member on the headlamp starts guiding a part of the second member before engagement of the first and second positioning members.

7. A structure for positioning a headlamp on a vehicle body, comprising:

first and second members of the vehicle body, the first member being brought closer to the second member to be put together with the second member; and holding means provided on the first member, which temporarily holds the headlamp in a first position on the first member as the first member is brought closer to the second member, and allows the headlamp to be released therefrom by the second member coming into contact with the headlamp and to move relative to the first member from the first position for positioning as the first member is put together with the second member.

\* \* \* \* \*

UNITED STATES PATENT AND TRADEMARK OFFICE
CERTIFICATE OF CORRECTION

| | | |
|---|---|---|
| PATENT NO. | : 7,338,191 B2 | Page 1 of 1 |
| APPLICATION NO. | : 10/870151 | |
| DATED | : March 4, 2008 | |
| INVENTOR(S) | : Konno et al. | |

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 87 days Delete the phrase "by 87" and insert -- by 197 days --

Signed and Sealed this

Twenty-seventh Day of January, 2009

JOHN DOLL
*Acting Director of the United States Patent and Trademark Office*